(12) United States Patent
Springer et al.

(10) Patent No.: US 12,165,646 B2
(45) Date of Patent: Dec. 10, 2024

(54) DELTA MODELS FOR PROVIDING PRIVATIZED SPEECH-TO-TEXT DURING VIRTUAL MEETINGS

(71) Applicant: Zoom Video Communications, Inc., San Jose, CA (US)

(72) Inventors: Shane Paul Springer, Manchester, MI (US); Alexander Waibel, Sammamish, WA (US)

(73) Assignee: Zoom Video Communications, Inc., San Jose, CA (US)

( * ) Notice: Subject to any disclaimer, the term of this patent is extended or adjusted under 35 U.S.C. 154(b) by 284 days.

(21) Appl. No.: 17/732,876

(22) Filed: Apr. 29, 2022

(65) Prior Publication Data
US 2023/0352026 A1  Nov. 2, 2023

(51) Int. Cl.
| | |
|---|---|
| G10L 15/26 | (2006.01) |
| G10L 15/06 | (2013.01) |
| G10L 15/183 | (2013.01) |
| G10L 15/30 | (2013.01) |

(52) U.S. Cl.
CPC ............ G10L 15/26 (2013.01); G10L 15/063 (2013.01); G10L 15/183 (2013.01); G10L 15/30 (2013.01); G10L 2015/0633 (2013.01)

(58) Field of Classification Search
CPC .... G06F 9/5022; G06F 3/167; G06F 16/3329; G06N 3/04; G06N 20/00; G10L 13/08; G10L 15/063; G10L 15/18; G10L 15/183; G10L 15/193; G10L 15/22; G10L 15/26; G10L 15/30; G10L 17/02; G10L 17/16; G10L 2015/0633; G10L 2015/227; G10L 15/197; H04L 12/1831; H04L 51/04; H04L 65/403; H04L 51/52; H04M 3/42221;
(Continued)

(56) References Cited

U.S. PATENT DOCUMENTS

| | | | |
|---|---|---|---|
| 7,302,391 B2 * | 11/2007 | Reding | G10L 13/08 |
| | | | 704/E15.047 |
| 10,832,654 B2 * | 11/2020 | Gray | G10L 15/063 |
| 10,917,613 B1 * | 2/2021 | Chiarella | H04N 7/157 |

(Continued)

*Primary Examiner* — Gerald Gauthier
(74) *Attorney, Agent, or Firm* — Kilpatrick Townsend & Stockton LLP

(57) ABSTRACT

Provided herein are systems and methods for delta models for providing privatized speech-to-text during virtual meetings. In one embodiment, a system may include a non-transitory computer-readable medium; a communications interface; and a processor. The processor may be configured to execute processor-executable instructions to: join a virtual meeting. Each participant in the virtual meeting may exchange audio streams with other participants in the virtual meeting. The instructions may include receiving, from a video conference provider, a local model for speech recognition. The local model may be a copy of a centralized model. The instructions may include performing speech recognition using the local model on the audio streams. Performing speech recognition may include identifying audio feature data within the one or more audio streams, identifying, based on a vocabulary database, user-specific vocabulary within the audio feature data, and generating, based on the user-specific vocabulary, a private transcription of the audio streams.

20 Claims, 9 Drawing Sheets

(58) Field of Classification Search
CPC .............. G06Q 10/10; G06Q 10/1095; G06Q 30/0601; G06Q 40/06; H04N 7/157
See application file for complete search history.

(56) References Cited

U.S. PATENT DOCUMENTS

| | | | | |
|---|---|---|---|---|
| 2008/0046458 A1* | 2/2008 | Tseng | ...................... | H04L 51/52 715/201 |
| 2011/0014897 A1* | 1/2011 | Finucan | ................ | G06Q 10/10 455/412.2 |
| 2011/0289574 A1* | 11/2011 | Hull | .................. | G06Q 30/0601 726/7 |
| 2012/0143605 A1* | 6/2012 | Thorsen | ................ | G10L 15/183 704/235 |
| 2018/0046957 A1* | 2/2018 | Yaari | .................. | G06Q 10/1095 |
| 2018/0174580 A1* | 6/2018 | Kim | ........................ | G10L 15/22 |
| 2018/0197543 A1* | 7/2018 | Gruenstein | ............. | G10L 15/18 |
| 2018/0218734 A1* | 8/2018 | Somech | .................. | G10L 15/26 |
| 2019/0005021 A1* | 1/2019 | Miller | ..................... | G10L 15/22 |
| 2019/0087455 A1* | 3/2019 | He | ............................ | G10L 15/22 |
| 2019/0132265 A1* | 5/2019 | Nowak-Przygodzki | ..................... | H04L 12/1831 |
| 2019/0205340 A1* | 7/2019 | Jhawar | ..................... | G06F 3/167 |
| 2020/0219517 A1* | 7/2020 | Wang | ..................... | G10L 17/02 |
| 2020/0327891 A1* | 10/2020 | Chhabra | ................. | H04L 51/04 |
| 2020/0349931 A1* | 11/2020 | Al Bawab | ......... | H04M 3/42221 |
| 2021/0065203 A1* | 3/2021 | Billigmeier | ............ | G06N 20/00 |
| 2021/0118427 A1* | 4/2021 | Braga | ................... | G10L 15/063 |
| 2021/0141818 A1* | 5/2021 | Wu | ..................... | G06F 16/3329 |
| 2021/0327410 A1* | 10/2021 | Beaufays | ................ | G10L 15/22 |
| 2021/0407520 A1* | 12/2021 | Neckermann | ........... | G10L 17/16 |
| 2022/0068280 A1* | 3/2022 | Bolanos | ................. | G06F 9/5022 |
| 2022/0122596 A1* | 4/2022 | Jessa | ..................... | G10L 15/063 |
| 2022/0327430 A1* | 10/2022 | Zuberi | ................... | G06Q 40/06 |
| 2022/0343913 A1* | 10/2022 | Yadav | ..................... | G10L 15/22 |
| 2022/0375492 A1* | 11/2022 | Grangier | ................. | G06N 3/04 |
| 2023/0343330 A1* | 10/2023 | Machanavajhala | ..... | G10L 15/22 |
| 2023/0352026 A1* | 11/2023 | Springer | ................ | G10L 15/063 |

* cited by examiner

DELTA MODELS FOR PROVIDING PRIVATIZED SPEECH-TO-TEXT DURING VIRTUAL MEETINGS

FIELD

The present application generally relates to videoconferences and more particularly relates to systems and methods for delta models for providing privatized speech-to-text during virtual meetings.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
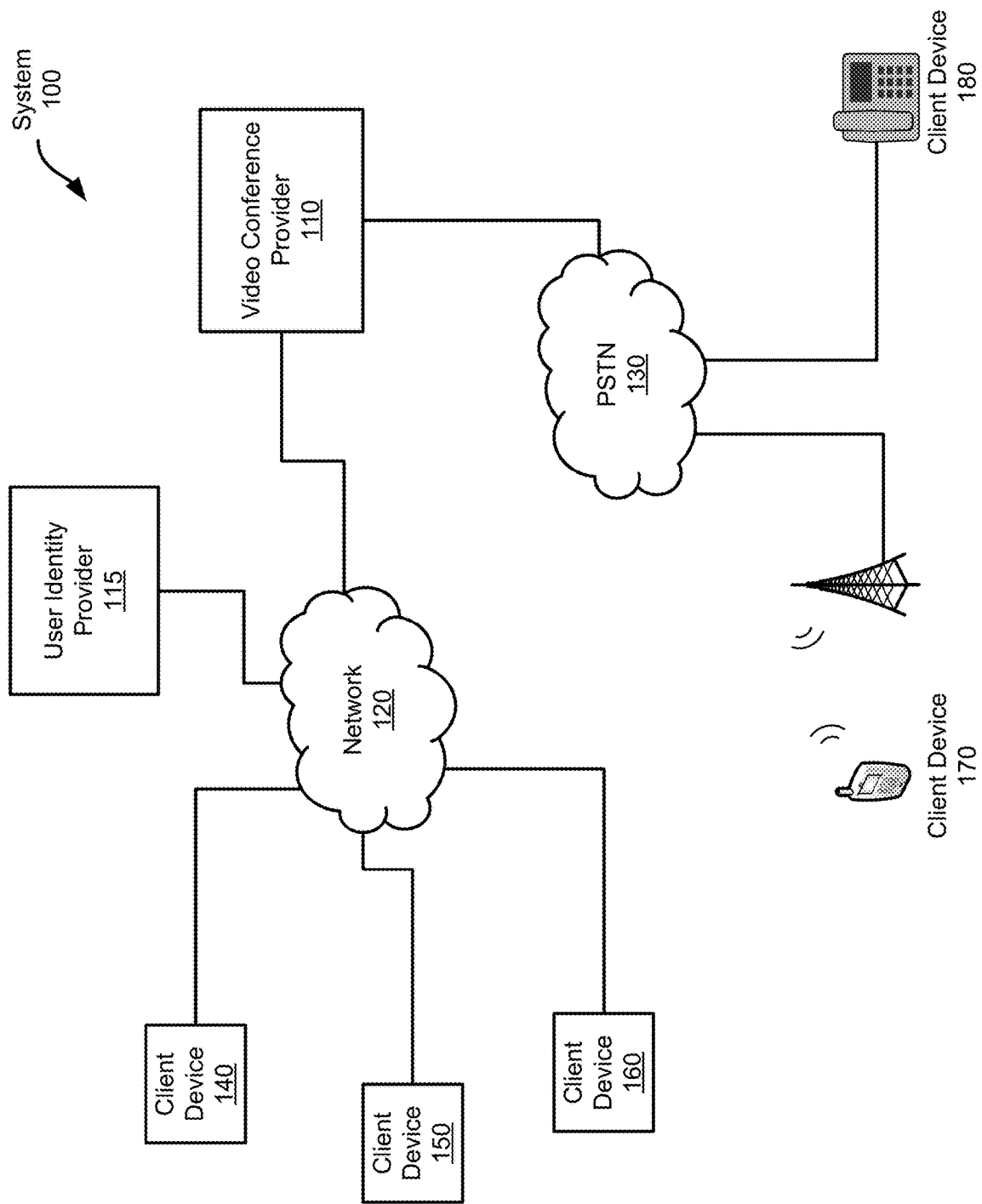
FIGS. 1, 2, and 3 show example systems for delta models for providing privatized speech-to-text during virtual meetings, according to an embodiment herein.

Examples are described herein in the context of systems and methods for delta models for providing privatized speech-to-text during virtual meetings. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Video conference providers can enable people to interact with each other using their own computers (or "client devices") with both video and audio in a variety of settings, such as in one-on-one conversations, group meetings, and webinars. While each of these types of settings can allow people to interact with each other, they can differ in character. For example, one-on-one conversations include only two people and may involve only a small amount of data being transmitted between the two client devices. Group meetings may involve a larger number of people all interacting with each other. In contrast, webinars typically involve a group of people that are attending to hear presentations from one or more presenters. Thus, in a webinar, interaction tends to be mostly one-way: from the presenter(s) to the audience. In addition, webinars can have very large numbers of participants, potentially numbering in the thousands or tens of thousands.

As the popularity of virtual meetings to replace conventional, in-person meetings, continues to rise, so too does the increase in privacy concerns for participants while in the virtual space. While participating in virtual meetings, participants generally have little control over their privacy, especially if a virtual meeting is being recorded or transcribed. For example, to improve transcription processes, speech databases and models specific to a speaker may be generated and utilized. User-specific speech databases and models, however, raise privacy concerns because they are developed based on personally-identifiable information of a user, such as vocabulary, speech pattern, and the like.

To provide an improved speech recognition system that utilizes user-specific speech databases and models, while minimizing privacy concerns, the systems and methods herein provide a delta model. The delta model, as provided herein, generates and provides a user-specific database, and in some cases a user-specific model, for speech recognition. The delta model may generate a user-specific database and/or model by collecting information associated with the user. For example, the delta model may gather vocabulary specific to the user based on the user's contact list, emails, and/or local files. Then, during a speech recognition process, the user-specific vocabulary may be utilized to improve the speech recognition and transcription results.

To protect the user's privacy, the delta model may be stored and run locally. In this manner, the user's personal information remains on the user's computing device, thereby protecting the user's privacy. Running a speech recognition model locally, however, can increase the local processing requirements. To reduce the processing requirements of local components, the delta model may be based on and/or run in conjunction with a complementary cloud-based model. In some embodiments, the delta model may transcribe user-specific components of speech data while the complementary cloud-based model transcribes the general components of the speech data. The transcription of the user-specific components and the general components of the speech data may be combined to provide the user a private transcription. In other embodiments, the delta model may transcribe the entirety of the speech data, including both the user-specific and general components.

A transcription generated using a user's delta model may include user-specific content. For example, the transcription may include user-specific vocabulary. The user-specific vocabulary may include personally-identifiable and/or private words or phrases. Accordingly, to provide a user increased control over his or her personal privacy, the systems and methods herein may also allow a user to control the sharing of the content within a private transcription. As noted above, a transcription generated using the user's delta model may be referred to herein as a private transcription. The private transcription may include user-specific content. As such, a user may control who receives the private transcription. For example, a user may indicate that he or she does not want to share the private transcription of a meeting recording with the other participants of the virtual meeting. As such, the other participants may not receive the user-specific components of the transcription. Instead, the other participants may receive a redacted transcription in which the user's user-specific content is removed or otherwise modified.

By providing the participant control over the degree to which personally-identifiable information is transcribed and shared, the participant may confidently engage in a virtual meeting and utilize speech recognition tools without concern about sharing personal information with individuals outside of the virtual meeting or unknown individuals after the meeting. Moreover, the delta model may improve the overall speech recognition and transcription process for a user, providing a more accurate and swift transcription of speech made during a virtual meeting.

This illustrative example is given to introduce the reader to the general subject matter discussed herein and the disclosure is not limited to this example. The following sections describe various additional non-limiting examples and examples of systems and methods for delta models for providing privatized speech-to-text during virtual meetings.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the video conference provider 110 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
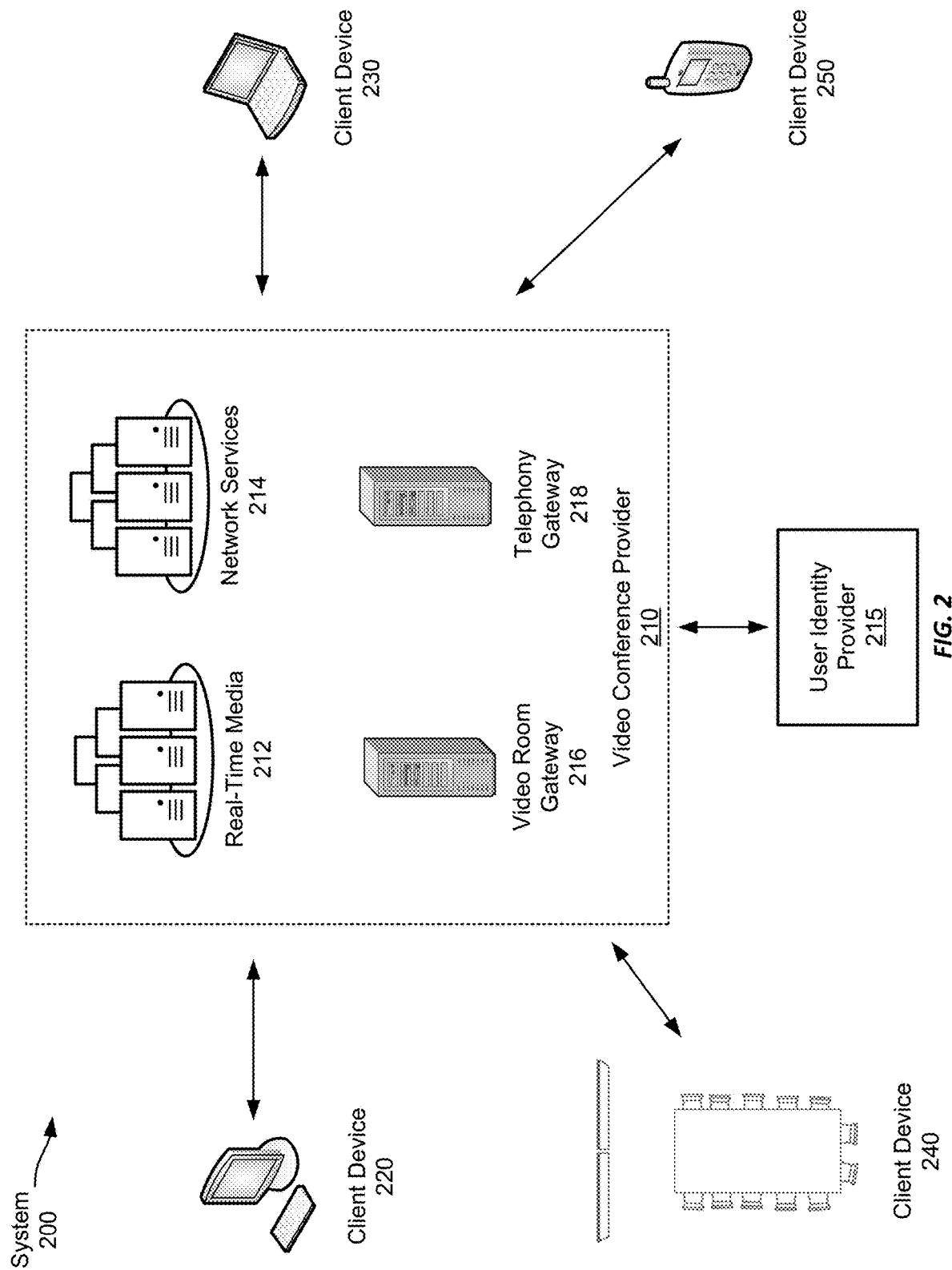

Video conference provider 110 allows clients to create videoconference meetings (or "meetings") and invite others to participate in those meetings as well as perform other related functionality, such as recording the meetings, generating transcripts from meeting audio, generating summaries and transcriptions from meeting audio, manage user functionality in the meetings, enable text messaging during the meetings, create and manage breakout rooms from the main meeting, etc. FIG. 2, described below, provides a more detailed description of the architecture and functionality of the video conference provider 110. It should be understood that the term "meeting" encompasses the term "webinar" used herein.

Meetings in this example video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started or the host may be required to specifically admit one or more of the users.

During the meeting, the participants may employ their client devices 140-180 to capture audio or video information and stream that information to the video conference provider 110. They also receive audio or video information from the video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can making conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 110 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider 110.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices. etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different Examples of video conference functionality, thereby enabling the various client devices to create and participate in video conference meetings. The video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference provider 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the network services servers 214 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider 210.

The video room gateway servers 216 provide specialized authentication and communication with the dedicated video conferencing hardware that may not be available to other client devices 220-230, 250. For example, the video conferencing hardware may register with the video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosed by the video conference provider 210. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
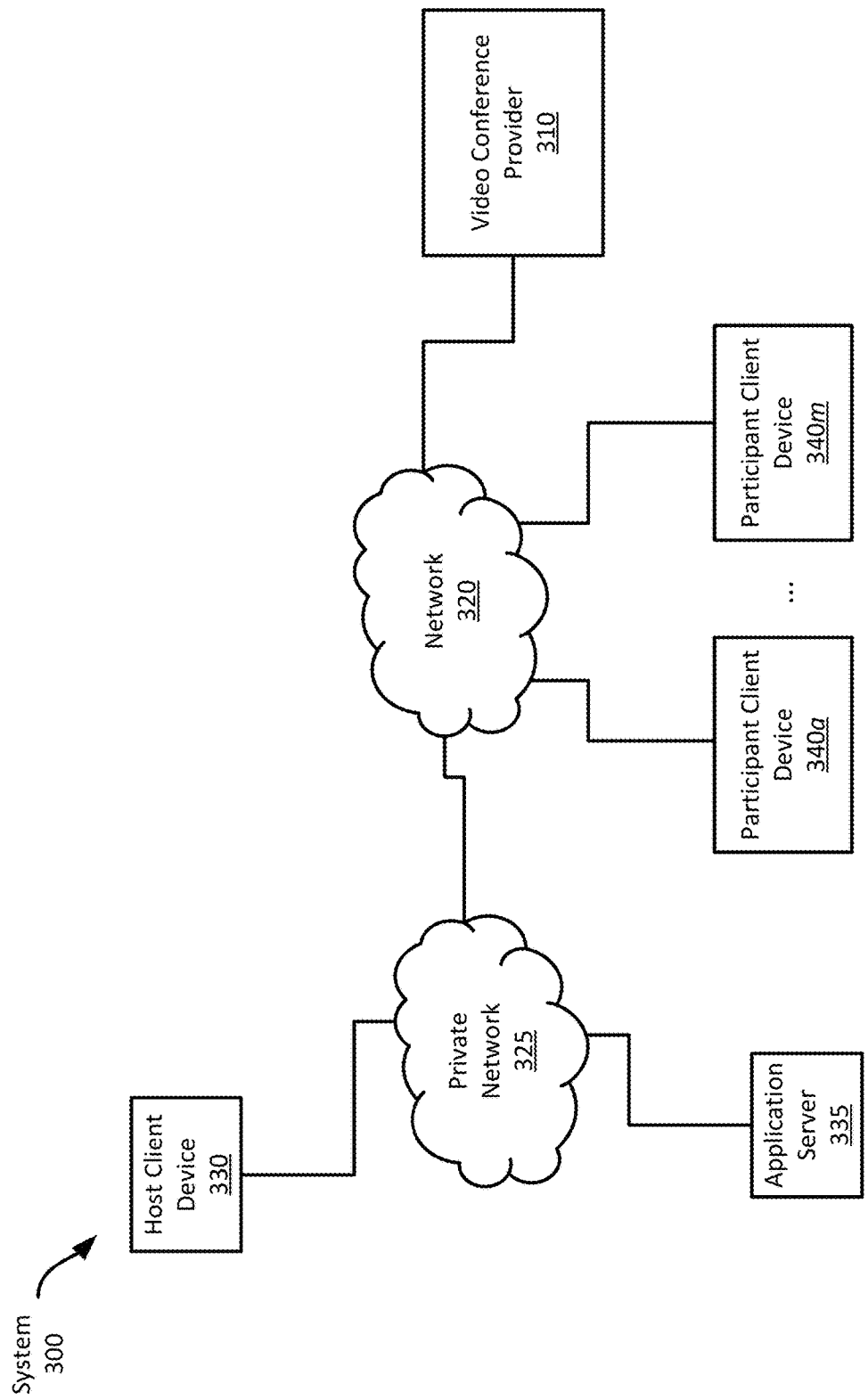

Referring now to FIG. 3, FIG. 3 shows an example system 300 for providing a delta model for translating speech-to-text during a virtual meeting. In this example, a video conference provider 310 provides video conference services to multiple different client devices 330 and 340a-m, generally as described above with respect to FIGS. 1 and 2. In this example, the client devices 330 and 340a-m participate in a meeting hosted by the video conference provider 310. Client devices 340a-m connect to the video conference provider 310 over a public network 320, e.g., the internet; however, host client device 330 participates from within a private network 325, such as from their office at work. In addition to the host client device 330, an application server 335 is connected to the private network and makes various business applications available to the host client device 330. In different examples, these business applications may vary; however, in this example, the application server 335 provides applications to access business databases and files. To access these various resources, the host client device 330 has different client applications installed on it and may also have web applications accessible via a web browser, which may be stored as bookmarks in the web browser.

To start a meeting, the host client device 330 connects to the video conference provider 310 and begins a main meeting ("meeting") at the video conference provider 310, such as by beginning a scheduled meeting, generally as described above with respect to FIGS. 1 and 2. The video conference provider 310 may create and manage the meeting as discussed above.

Once the main meeting is started, participants may be able to interact with other participants and see their respective names, such as in close proximity to other participants' video streams or in a list of participants visible in a graphical user interface ("GUI"). In some embodiments, the participants may only be able to see information, e.g., names or video feeds, from the host(s) of the webinar or certain select participants that will be engaged in discussions during the main meeting, such as panelists in a panel discussion. Still other limits may be imposed on the various participants, such as their ability to react to occurrences during the meeting, e.g., participants may be allowed to interact with their GUI to raise their hand to ask a question, but may not be allowed to provide any other feedback.

During the meeting, the participants may exchange audio streams. For example, audio streams from one or more of the participant client devices 340a-m and the host client device 330 may be transmitted to the video conference provider 310, which in turn may transmit the audio stream(s) to the other participants. At some point during the meeting or after the meeting, one of the participants may request transcription of the audio stream(s). For example, the participant client device 340a may request transcription of the audio streams exchanged during the meeting. In another example, the participant client device 340b may request a transcript of the meeting based on a recording of the meeting after the meeting is terminated.

To provide transcription of the audio stream(s), a speech recognition model may be utilized. During a transcription process, the speech recognition model may use a vocabulary database to recognize words within the audio data. Currently, when the audio data includes new or strange words, the transcription model may provide an inaccurate transcription since the new or strange words are not present in the vocabulary database. In the present fast-paced world, new and strange words are common, especially within the work or education context where meeting topics often include terms that are not normally included in a generic vocabulary database. Moreover, as the virtual space allows for increasing interconnectedness throughout the globe, daily vocabulary becomes increasingly comingled with non-native terms and names.

To address the issues with expanding vocabularies, traditional recognizers or recognition models can instead be provided with personalized vocabulary databases. Personalized vocabulary databases, however, can be problematic for privacy reasons. For example, a vocabulary database that is specific to a user may gather words associated with that user, including family member names, addresses, hobbies, passwords, credit card information, etc. Such terms may be private to the user and thus a concern with a personalized vocabulary database may be the security of the database and the transcription model. Even when a transcription model utilizes end-to-end encryption when transmitting and receiving the personal vocabulary of a user, the user may still be uncertain about the security of his or her personal information. To improve the transcription process and provide a private personalized vocabulary database and/or model, a delta model may be used in some examples.

Figure 4:
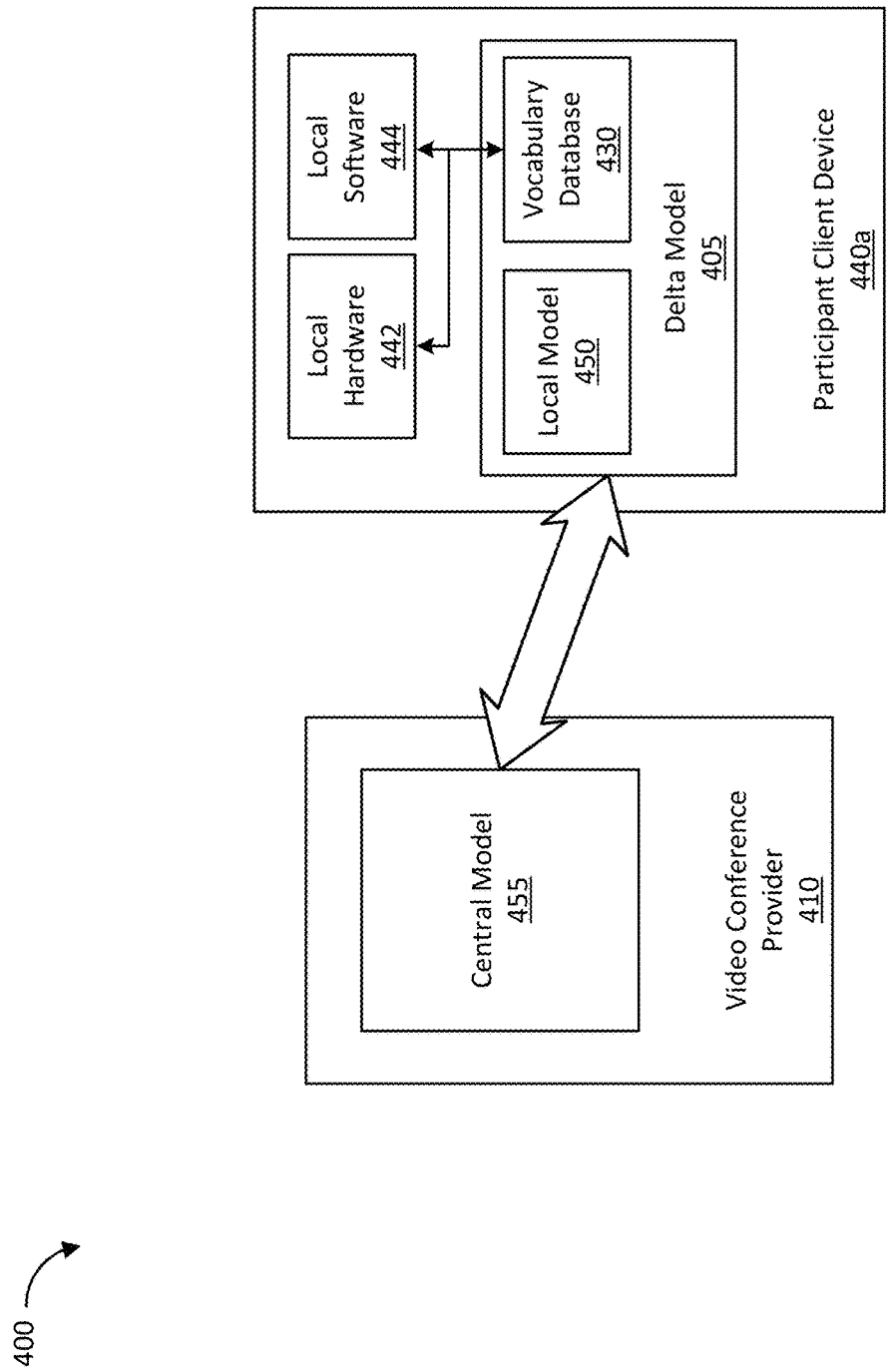
FIG. 4 illustrates an example system for delta models for providing privatized speech-to-text during virtual meetings, according to an embodiment herein.

Referring now to FIG. 4, an example system 400 for providing a delta model 405 for translating speech-to-text during virtual meetings is provided, according to an embodiment herein. As shown, the system 400 may include a video conference provider 410 and a participant client device 440a. The video conference provider 410 may be the same or similar to the video conference provider 310. Similarly, the participant client device 440a may be the same or similar to the participant client device 340a.

As shown, the video conference provider 410 may include a central model 455. The central model 455 may be or include a common model, such as a speech recognition model, vision model, or language model. For ease of this discussion, the centralized model 455 is described as a speech recognition model, however, the centralized model 455 may include any type of suitable model. The centralized model 455 may be computed and/or trained on data external to the user, such as for example, historical data, publicly available data, standard dictionaries, and the like.

As illustrated, the participant client device 440a may include the delta model 405. The delta model 405 may provide a personalized model that provides for private transcription that is personalized for a user associated with the participant client device 440a. For example, the delta model 405 may generate a personal profile that is specific to a user. The personal profile may include vocabulary that is specific to the user, including terms associated with projects or interests of the user, terms the user often uses, and names of individuals or places that are associated with the user. Because the vocabulary database is personalized to a user or a meeting, words relevant to the user or the meeting (e.g., names, project names, subject matter terms) may be readily accessible by the transcription model, thereby providing for a more accurate transcription.

To provide security of the personal profile, the delta model 405 may be processed and run locally on a user's system. The personalized vocabulary gathered by the delta model 405 may be kept locally on the user's system, even during the transcription process. By keeping and running the delta model 405 locally, the user can be assured that his or her personal information remains confidential because it is not transmitted to another system (e.g., the video conference provider 310 or third party) for the transcription process. In this manner, the user can maintain control over his or her personal information and be confident in the privacy of the transcription process.

To incorporate words from the vocabulary database 430 into the centralized model 455, the delta model 405 may include a local model 450. The local model 450 may be a complementary model of the centralized model 455. For example, the local model 450 may be a local version or copy of the centralized model 455 that is saved on the participant client device 440a. The local model 450 may be run in tandem to the centralized model 455. The local model 450, however, may perform speech recognition of only a portion of the speech data. Specifically, the local model 450 may identify keywords (e.g., components of the speech data) that are user-specific (e.g., included in the vocabulary database 430) and transcribe those keywords according to the employed speech recognition model to generate a private transcription. In some embodiments, the local model 450 may perform speech recognition and transcription of the entirety of the audio data to generate the private transcription.

In some embodiments, the centralized model 455 may identify words that are non-user specific (e.g., generic components of the speech data) and transcribe those words according to the same or a similar speech recognition model to generate a general transcription of the audio data. The general transcription may be considered a partial transcription since it may not include transcription of the user-specific content. The centralized model 455 may run in parallel to the local model 450. The centralized model 455 and the local model 450 may combine their respective transcriptions (e.g., the general transcription and the private transcription, respectively) to provide a complete transcription of the audio data.

To keep the user-specific vocabulary private, the transcription from the centralized model 455 may be provided to the local model 450, where the transcriptions are combined locally. One or both of the centralized model 455 and the local model 450 may flag any identified user-specific keywords in the audio data. Flagging the identified user-specific keywords may generate a map of the audio data for the user-specific keywords. Using this map, the local model 450 may insert the transcription of the user-specific keywords into the centralized transcription. As will be described in greater detail with respect to FIG. 7, in some embodiments, a user may approve sharing of his or her personalized vocabulary database 430 with other recipients. In such cases, the local model 450 may transmit the identified user-specific keywords with the centralized model 455 to generate a complete transcription that is shared with the approved recipients.

As noted above, the delta model 405 may generate a personal profile that is specific to a user. The personal profile may include vocabulary that is specific to that user and/or a given meeting that the user is participating in. To generate the personal profile, the delta model 405 may communicate with local hardware 442 and/or local software 444 present on the participant client device 440a. For example, the delta model 405 may process files or documents present on the participant client device 440a for words to add to the vocabulary database 430. The delta model 405 may also access email account(s) and/or calendar(s) associated with the participant client device 440a for user-specific words to add to the vocabulary database 430. In some embodiments, the delta model 405 may analyze past transcriptions, both private and general, for terms to add to the vocabulary database 430. For example, the delta model 405 may communicate with the video conference provider 410 for past transcriptions involving the participant client device 440a.

In some embodiments, the delta model 405 may generate a personal profile for an upcoming meeting. For example, prior to joining a virtual meeting, the delta model 405 may access a calendar invitation for the virtual meeting. Upon accessing the calendar invitation, the delta model 405 may analyze the information associated with the virtual meeting to add vocabulary specific to that meeting to the vocabulary database 430. For example, the delta model 405 may analyze PowerPoint slides or documents in the calendar invitation or associated with a topic of the meeting. The delta model 405 may also add terms associated with the meeting invitees/participants (e.g., names, locations, organization names). Once the words associated with the meeting are identified, the delta model 405 may add the words to the vocabulary database 430. In some embodiments, the delta model 405 may identify these words as more relevant than other words within the vocabulary database 430 since they are identified as associated with the upcoming meeting.

In some embodiments, the delta model 405 may use machine learning to identify a user's speech pattern and to improve the speech recognition process performed by the local model 450. For example, the user associated with the participant client device 440a may have a unique speech pattern, such as a lisp, accent, or tendency to use certain words together. Over time, the delta model 405 may learn to associate the user's speech pattern with various terms within the vocabulary database 430 to customize the local model 450 to be a user-specific speech recognition model.

Figure 5:
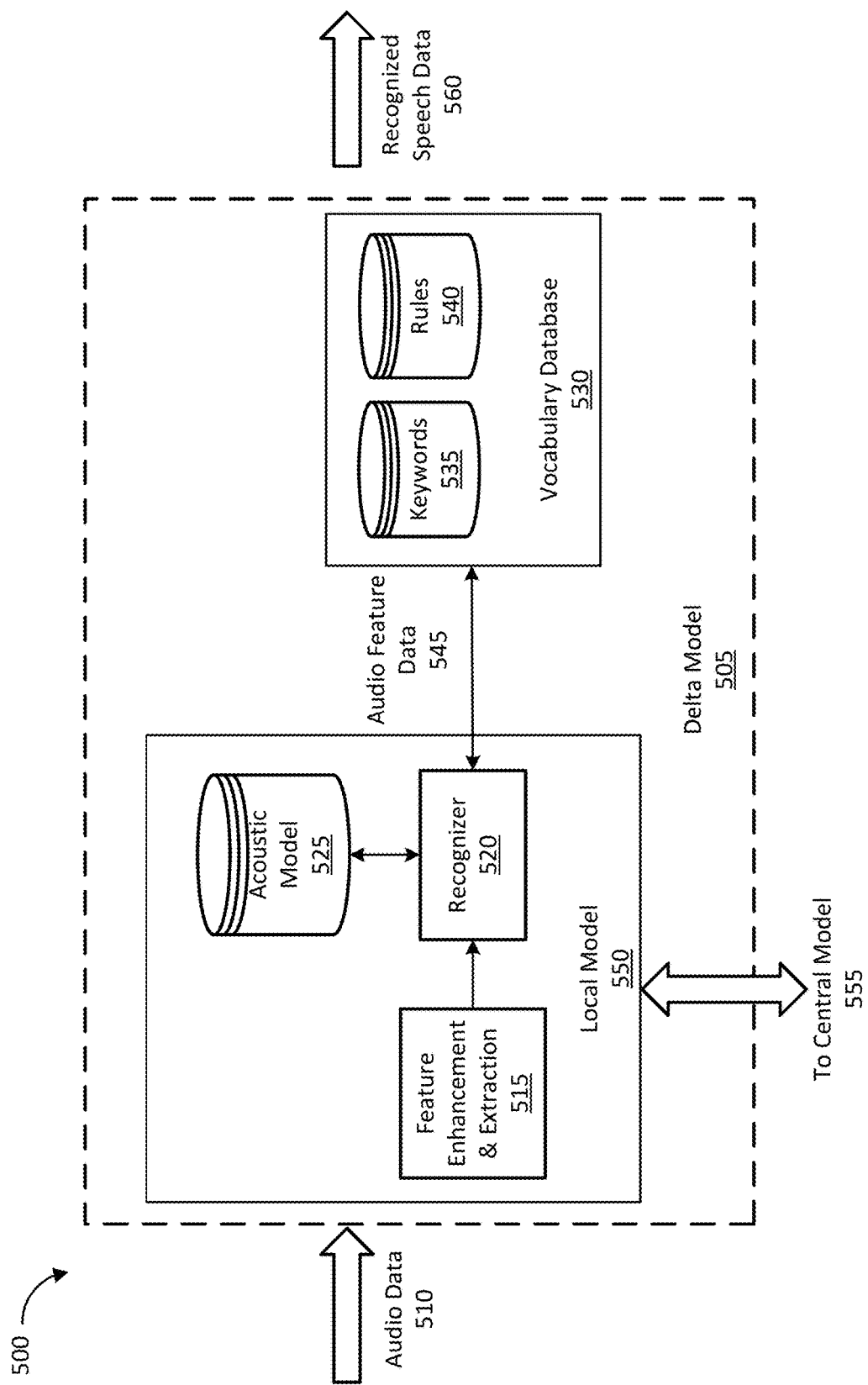
FIG. 5 illustrates an example speech recognition system, according to an embodiment herein.

Turning now to FIG. 5, an example speech recognition system 500 is provided. For example, the speech recognition system 500 may be part of or include the delta model 405. For example, the speech recognition system 500 may be locally executed on a client device, such as the client device 440a. In some examples, one or more components of the speech recognition system 500 may be cloud-based and/or remotely executed by a video conference provider, such as the video conference provider 410, or a third party system. For example, one or more of the feature enhancement and extraction module 515, a recognizer 520, and/or the acoustic model 525 may be remotely based.

The speech recognition system 500 may be used to perform a variety of speech recognition functions for providing a privatized translation of speech-to-text during a virtual meeting. For example, in some embodiments, the speech recognition system 500 may be used to identify user-specific keywords and provide speech translation of the audio data. In other embodiments, the speech recognition system 500 may be used to process the audio streams to generate a transcript of the meeting.

To perform speech recognition, the speech recognition system 500 may include a delta model 505. The delta model 505 may receive audio data 510. The audio data 510 may correspond to audio captured by the client device 440a, for example by a microphone. In other embodiments, the audio data 510 may be received from the video conference provider 310. The audio data 510 may be a recording of an audio stream or may be a transcript of the audio stream. The delta model 505 may be or include a speech recognition system or model as known in the art. The following is an example speech recognition module following an example speech recognition process, however, it should be understood that other speech recognition modules or processes may be used.

Once the audio data 510 is received by the delta model 505, the audio data 510 may be processed by a local model 550. The local model 550 may be the same or similar to the local model 450. The local model 550 may include a feature enhancement and extraction module 515. The feature enhancement and extraction module 515 may analyze the audio data for features corresponding to words and then enhance and extract any identified features. The identified features may correspond to audio waveforms present in human speech.

The delta model 505 may also include a recognizer 520. The recognizer 520 may receive the identified features from the audio data 510. The recognizer 520 may employ an acoustic model 525 and a vocabulary database 530 to determine or associate the audio feature data 545 in the audio data 510 to one or more words.

As noted above, one or more features of the local model 550 (e.g., the feature enhancement and extraction module 515, the recognizer 520) may be performed remotely by, for example, a central model 555. The central model 555 may be the same or similar to the central model 455. For example, the central model 555 may be cloud-based and run by the video conference provider 410. In some embodiments, the one or more features of the local model 550 may run in parallel or in conjunction with a similar feature of the central model 555. In this manner, the local processing requirements for the local model 550 may be eased by using remote resources provided by the central model 555.

In an example embodiment, the acoustic model 525 may analyze the raw audio waveforms in the audio feature data 545 and determine a corresponding phoneme for each waveform. In some embodiments, this is performed at the character or subword level. The vocabulary database 530 may be a language model. The vocabulary database 530 may include a rules database 540 and a keyword database 535. The rules database 540 may provide various rules for speech, allowing the recognizer to discard any association of the audio feature data 545 (e.g., audio waveforms) to phonemes that are improbable given the constraints of proper grammar and the topic of discussion. Once an appropriate mapping of the audio feature data 545 to phonemes is generated, the recognizer 520 may determine words associated with the phonemes. The words may be based on the keywords database 535.

In some embodiments, the audio feature data 545 may be mapped to words within the keywords database 535. The delta model 505 may query the vocabulary database 530 based on the audio feature data 545. The database of known keywords 535 may be queried to identify any keywords in the stream of audio feature data 545. Keywords in the keyword database 535 may include user-specific keywords that have been gathered by the delta model 505, as discussed above. For example, the keywords in the keyword database 535 may relate to or be based on participant A, who corresponds to the participant client device 440*a*. The keywords may include words relating to the identity of participant A or personally identifiable information about participant A, such as the first and last name of participant A. In some cases, the keywords may include an office or location of participant A. Other keywords may include the names of projects, areas, or topics that participant A is involved in. In some embodiments, keywords may include one or more emotion expressions, such as a distinct laughter, or identifiable speech characteristics, such as an accent. In some embodiments, the keywords database 535 may also include general, non-user specific words (e.g., "computer," "person," "the") such that the delta model 505 can perform speech recognition and translation of the audio data 510 beyond only the user-specific keywords.

As discussed above, the keywords in the keyword database 535 may be gathered from participant A or from the participant client device 440*a*. For example, the delta model 505 may gather keywords for the keyword database 535 from documents on the participant client device 440*a*, emails exchanged on the participant client device 440*a*, or information associated with the virtual meeting. If the delta model 505 has permission to search other applications on the client device 440*a*, the delta model 505 may gather keywords from folders, calendars, emails, or other applications running on the client device 440*a*. In still further embodiments, the delta model 505 may perform an interest search for terms associated with a topic related to the participant. For example, the delta model 505 may identify one or more topics associated with the meeting, by for example the subject of the meeting invitation. Then, the delta model 505 may perform an internet search based on the one or more topics to determine relevant terms associated with that topic(s). The delta model 505 may then add the terms or phrases related to the meeting topic to the keyword database 535.

In other embodiments, the delta model 505 may receive some or all the keywords from the participant's profile with the video conference provider 410. In some embodiments, the delta model 505 may employ one or more machine learning ("ML") techniques to identify keywords for the keyword database 535.

It should be understood that a keyword may include more than one word. For example, "Project Alpha" may be a "keyword" as indicating that the phrase "Project Alpha" is a personally identifiable characteristic for participant A. Depending on various implementations, multi-word keywords may be treated as a single keyword or as multiple associated keywords. Further, a keyword may have multiple different forms. For example, a keyword may be a verb, which may be spelled different depending on context, e.g., it is conjugated differently depending on tense, subject, etc. Thus, a keyword may include variants of a base word, e.g., "look for," "looking for," and "looked for." In some examples each of these may be a distinct keyword, while in other examples, the variants may be associated with a base term, e.g., "look," that is used as the keyword. However, any suitable approach to recognizing keywords may be used.

In some embodiments, the delta model 505 may employ a trained ML technique to semantically analyze and map the audio feature data 545 to keywords within the keyword database 535. For example, the vocabulary database 530 may include the rules database 540 that provides various rules for mapping the audio feature data 545 to the keywords within the keywords database 535. As noted above, the rules database 540 may include various rules on grammar or language rules that provide bounds for mapping of the audio feature data 545 to the keywords database 535. In some embodiments, the rules database 540 may also include rules involving a rating of various keywords. For example, keywords that are identified as part of the meeting invitation may be flagged with a high rating, indicating that they are likely to be within the audio feature data 545 if the audio data 510 is from that meeting. A higher rating may indicate a higher likelihood that a keyword may be present within the audio feature data 545.

In some embodiments, the delta model 505 may identify irrelevant keywords, terms, or phrases. Irrelevant keywords, including terms or phrases, may be keywords that have not been included in the audio data 510 for a certain time duration. For example, the delta model 505 may identify an irrelevant keyword that has not been included in the audio data 510 for the past 3 months. Once the irrelevant keywords are identified, the delta model 505 may remove the irrelevant keywords from the vocabulary database 530.

After the audio feature data 545 is mapped to keywords within the keywords database 535, the delta model 505 may generate recognized speech data 560. The recognized speech data 560 may be used to generate a private transcription of the audio data 510. As discussed above, the delta model 505 may perform speech recognition and transcription of the audio data 510 parallel to or in conjunction with the central model 555. In some embodiments, the recognized speech data 560 may only include transcription of user-specific keywords within the audio data 510. To generate the private transcription, the recognized speech data 560 may be combined with general text data (not shown) received from the central model 555. The general speech data may be or include transcription of the non-user specific keywords within the audio data 510. The delta model 505 may combine the recognized speech data 560 with the general speech data to generate a private transcription. The private transcription may be saved locally to preserve a participant's privacy.

It should be understood that this process may be performed nearly instantaneously. For example, the delta model 505 may generate the recognized speech data 560 during the meeting as the audio streams are being received by the video conference provider 310 or another system that is hosting the speech recognition system 500.

The central model 555 may generate a general transcription based off the general speech data. The general transcription may include transcription of the audio data 510 without the user-specific keywords. Because the user-specific keywords are only located within the delta model 505, any transcription by the central model 555 may not include the user-specific keywords. In some embodiments, a participant may share his or her private transcription of the audio data 510 and/or personal profile (e.g., vocabulary database 530 or delta model 505) with one or more recipients.

Figure 6:
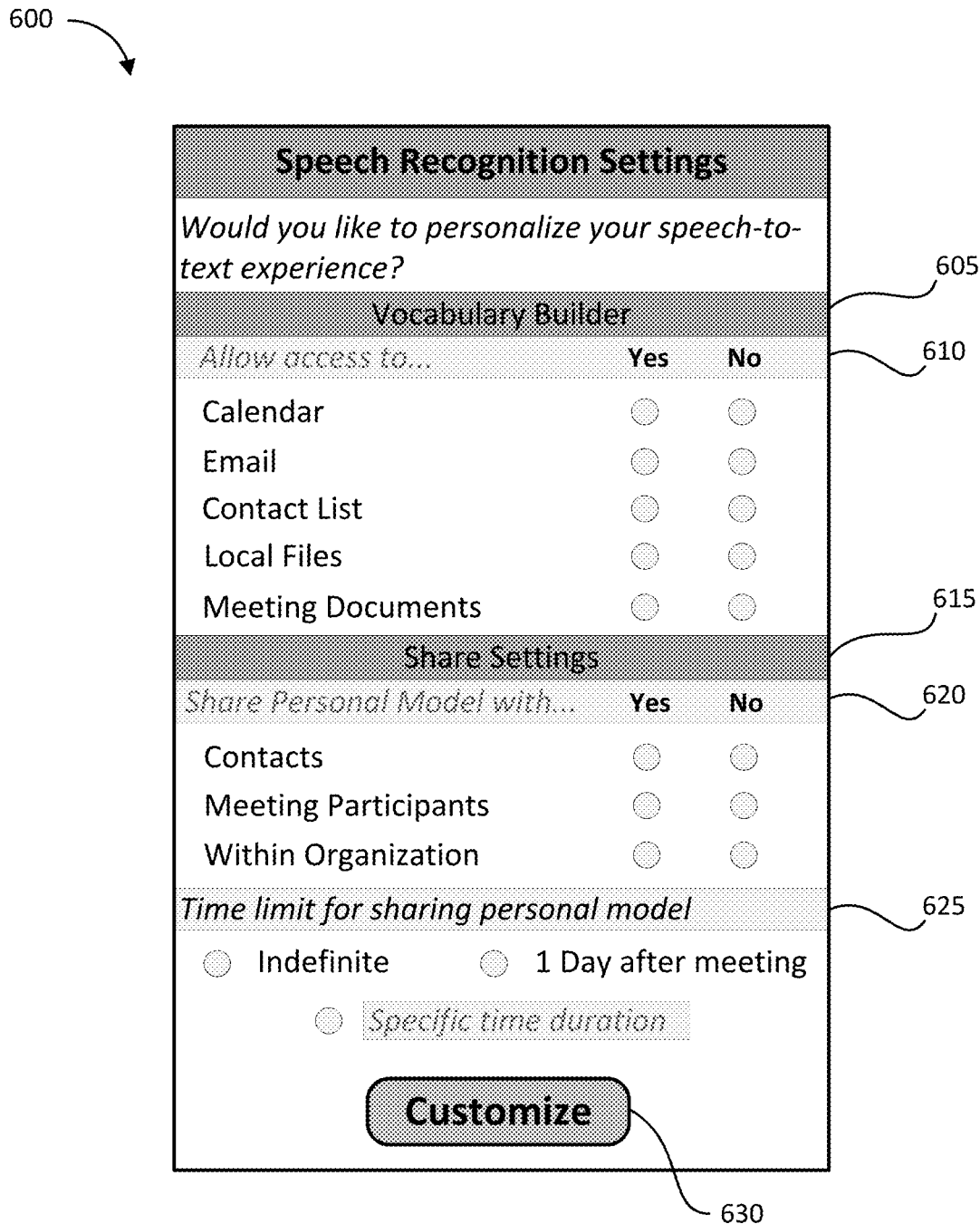
FIG. 6 illustrates a speech recognition settings prompt, according to an embodiment herein.

Referring now to FIG. 6, a speech recognition settings prompt 600 is provided according to an embodiment herein. The speech recognition settings prompt 600 may allow a participant to identify one or more recipients for which a private transcription can be shared with. The speech recognition settings prompt 600 may also include various settings for where the delta model 505 can gather user-specific keywords. The speech recognition settings prompt 600 may provide a participant increased control over his or her privacy.

The speech recognition settings prompt 600 may include a vocabulary builder pane 605. The vocabulary builder pane 605 may provide various settings 610 for where the delta model 505 may search to gather user-specific keywords. For example, as illustrated, the vocabulary builder pane 605 may provide a participant the ability to allow or deny the delta model 505 access to a calendar, email account, contact list, local files, and/or meeting documents for gathering user-specific keywords.

The speech recognition settings prompt 600 may also include a share settings pane 615. The share settings pane 615 may provide various settings 620 for recipient(s) that may receive a private transcription generated by the delta model 505. For example, a participant may provide approval to share his or her private transcription with the other meeting participants that were present during the virtual meeting. As such, the private transcription may be shared with the other meeting participants, either upon request by the other participants, upon termination of the meeting, or transcription of the meeting recording. The participant may allow or deny sharing of his or her private transcription with recipients on his or her contact list and/or recipients who are within his or her organization.

In some embodiments, a participant may share his or her delta model 505 with other participants within a virtual meeting. For example, participants of a virtual meeting may allow sharing of their delta models 505 and/or vocabulary databases 530 so as to improve each other's transcription of a virtual meeting. Sharing of delta models 505 and/or vocabulary databases 530 may improve each the transcription process because each of the delta models 505 can improve upon each other's process and/or learn from each other's vocabulary database 530.

In some embodiments, the participant may approve sharing of his or her private transcription or delta model 505 with the video conference provider 510. That is, the participant may approve sharing of his or her delta model 505 with the centralized model 555 to improve the speech recognition process of the centralized model 455. For example, if the participant says "I vacation in Cote d'Ivoire," the local model 505 may recognize "Cote d'Ivoire" as a location based on the participant's vocabulary database 530. The centralized model 555, however, may translate "Cote d'Ivoire" as "coats deep armoire." To improve the speech recognition process of the centralized model 555, the delta model 505, with the participant's approval, may be shared with the centralized model 555.

If a participant does not allow sharing of his or her personal profile and/or private transcription with a recipient group, then that recipient group may only receive a general transcription of the audio data. The general transcription may not include the user-specific keywords/components. In some embodiments, instead of the general transcription, the recipient group may receive a neutralized transcription from the participant client device 440a. For example, the delta model 405 may neutralize the private transcription for sharing with the recipient group. To generate the neutralized transcription, the delta model 405 may modify the user-specific keywords within the private transcription. Modification of the user-specific keywords may include redacting the user-specific keywords or changing the user-specific keywords for generic or neutral keywords. For example, user-specific keywords may include terms such as "loo" or "quid" that may be immediately identifiable with a British accent or location associated with the participant. As such, the delta model 405 may identify these user-specific keywords and modify them to more neutral terms, such as "bathroom" or "currency" within a neutralized transcription. Accordingly, recipients who are not approved to receive the participant's private transcription may either receive the general transcription from the video conference provider 410 or a neutralized transcription from the participant's client device 440a.

In embodiments where the recipient group is approved to receive the private transcription, the participant may select to either share the private transcription generated by the delta model 405 or to share his or her personal profile with the recipient's delta model. For example, the participant may allow the recipient's delta model access to his or her vocabulary database 530 for transcription purposes. Thus, instead of transmitting the private transcription to the recipient, the recipient's delta model may communicate with the participant's delta model 405 for transcription of the user-specific keywords/components of the audio data.

The speech recognition settings prompt 600 may also include a time limit pane 625. The time limit pane 625 may allow the participant to set a time limit for sharing of his or her personal transcription. For example, the participant may indicate that the private transcription may be shared with the other meeting participants but only for a week after the meeting. The time limit pane 625, along with the share settings pane, and the vocabulary builder 605, may allow the participant to customize the delta model 505 and the sharing of the private transcription to his or her privacy needs. Once the participant has selected his or her desired preferences for the delta model 505, the participant may select the customize selection 630. Upon selection of the customize selection 630, the delta model 505 may function according to the selected settings.

It should be understood that the vocabulary builder pane 605, the share settings pane 615, and the time limit pane 625 are simple illustrations for ease of explanation and any variety of settings and options for the functionality and access of the delta model 505 may be included in these panes.

Figure 7:
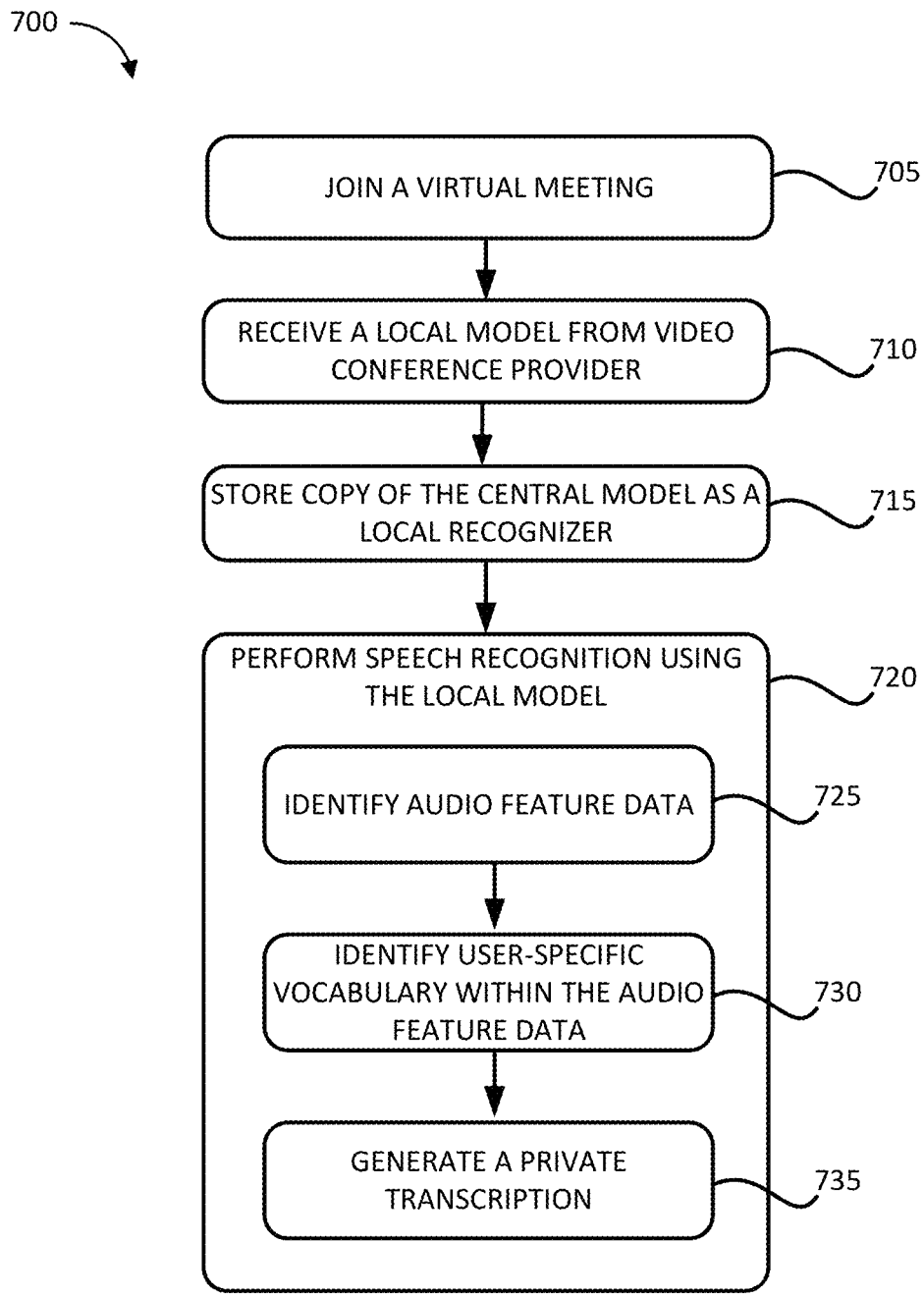
FIG. 7 illustrates an exemplary method for delta models for providing privatized speech-to-text during virtual meetings, according to an embodiment herein.

Referring now to FIG. 7, a flowchart of an example method 700 for providing delta models for privatized speech-to-text during virtual meetings is illustrated. The description of the method 700 in FIG. 7 will be made with reference to FIGS. 3-6, however any suitable system according to this disclosure may be used, such as the example systems 100 and 200, shown in FIGS. 1 and 2.

The method 700 may include step 705. Step 705 may include joining, by a first client device, a virtual meeting. The virtual meeting may include a plurality of participants, each of which exchanges one or more audio streams via the virtual meeting. At step 710, the first client device may receive, from a video conference provider, a local model for speech recognition. The local model, such as the local model 450, may include or be a copy of a centralized model, such as centralized model 455. The first client device may store the copy of the central model (e.g., the local model) as a local recognizer.

The method 700 may include performing speech recognition using the local model, at step 715. Speech recognition may be performed on the one or more audio streams exchanged during the virtual meeting. Performing speech recognition may include substeps 725-735. For example, at step 725, the method may include identifying, by the local recognizer, audio feature data within the one or more audio streams. At step 730, the method may include identifying, based on a vocabulary database, user-specific vocabulary within the audio feature data, and at step 735, generating, based on the user-specific vocabulary, a private transcription of the one or more audio streams. The private transcription may include the user-specific vocabulary.

In some embodiments, the method may include generating the vocabulary database. The vocabulary database may be generated based on locally available data, such as for example, a user's calendar, a user's email account, a user's contact list, past private transcriptions of a user's audio data, documents stored locally, and information associated with a virtual meeting. In some cases, the local model may be trained to generate one or more associations between the audio feature data and a plurality of terms or phrases in the vocabulary database to more readily identify user-specific vocabulary.

In some embodiments, the method may further include neutralizing, by the first client device, the private transcription. Neutralizing the private transcription may include modifying the user-specific vocabulary in the private transcription. For example, modifying the user-specific vocabulary in the private transcription may include removing at least a portion of the user-specific vocabulary from the private transcription or replacing at least a portion of the user-specific vocabulary in the private transcription with generic vocabulary. After neutralizing the private transcription, the first client device may generate a neutralized transcription based on neutralizing the private transcription and transmit to the video conference provider the neutralized transcription. In some embodiments, the first client device may also transmit an indication to share the neutralized transcription with the plurality of participants from the virtual meeting.

In other embodiments, the method may include transmitting, to the video conference provider, the private transcription, neutralizing, by the video conference provider, the private transcription, and generating, by the video conference provider, a neutralized transcription based on neutralizing the private transcription. Similar to the above embodiment, neutralizing the private transcription may include modifying the user-specific vocabulary in the private transcription. After neutralizing, the first client device may indicate to the video conference provider to share the private transcription with one or more plurality of participants from the virtual meeting.

In some embodiments, the first client device may receive from the video conference provider a partial transcription of the one or more audio streams. The partial transcription may include transcription of the non-user specific content from the one or more audio streams. The first client device may combine the partial transcription with the private transcription to generate a complete transcription. The complete transcription may include transcription of both the user-specific content and the non-user specific content.

Figure 8:
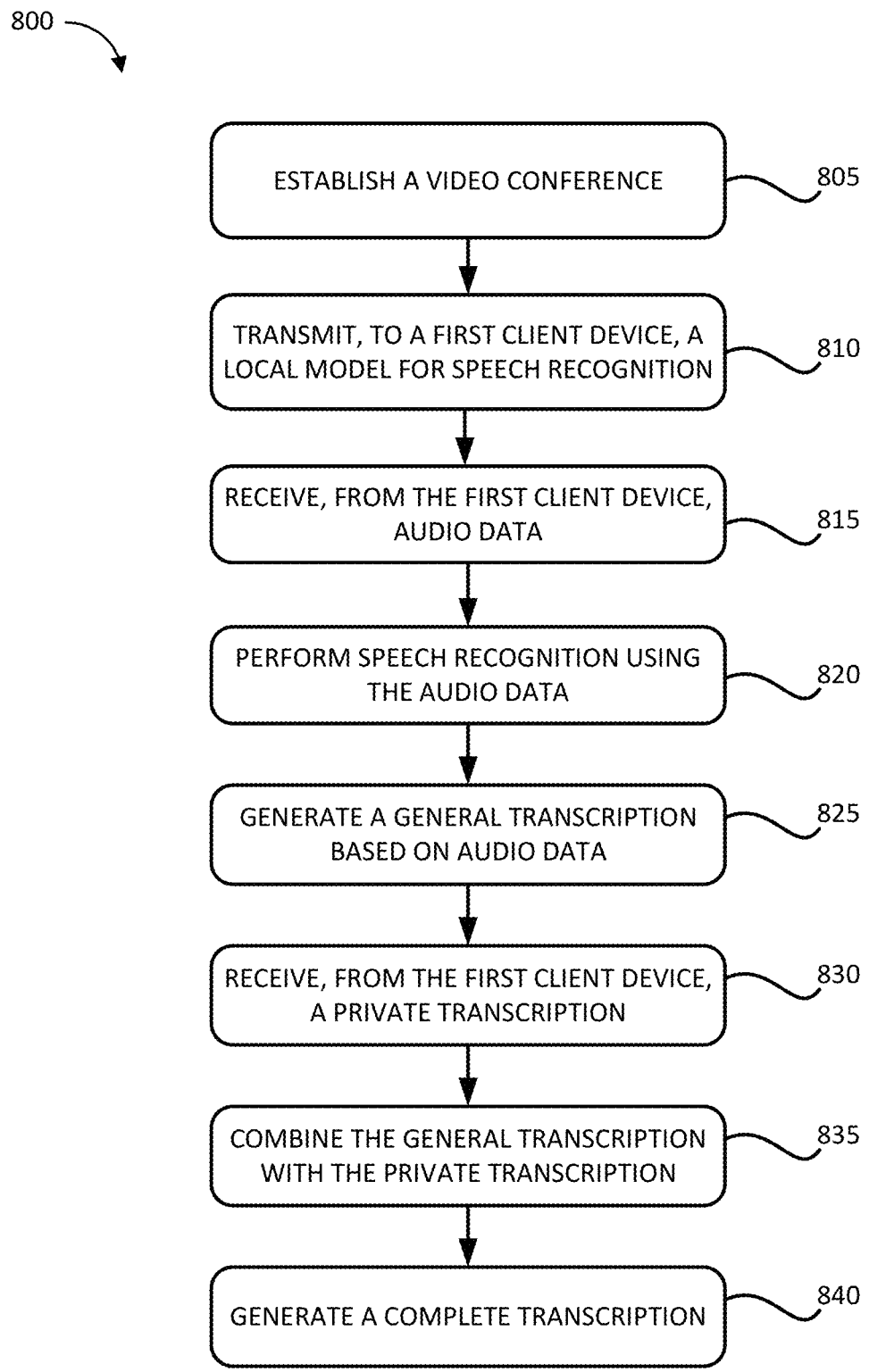
FIG. 8 illustrates another exemplary method for delta models for providing privatized speech-to-text during virtual meetings, according to an embodiment herein.

Referring now to FIG. 8, a flowchart of another example method 800 for providing a delta model translating speech-to-text during virtual meetings is illustrated. The description of the method 800 in FIG. 8 will be made with reference to FIGS. 3-6, however any suitable system according to this disclosure may be used, such as the example systems 100 and 200, shown in FIGS. 1 and 2.

The method 800 may include step 805. At step 805, the method may include establishing a virtual meeting having a plurality of participants. Each of the plurality of participants may exchange one or more audio streams during the virtual meeting. Method 800 may include step 810 at which a local model for speech recognition is transmitted to a first client device. The local model, such as the local model 450, may be a copy of a centralized model, such as the centralized model 455.

The method 800 may include step 815. At step 815, audio data may be received from the first client device. Then, at step 820, the method may include performing speech recognition on the audio data using the centralized model to recognize one or more keywords. Based on the keywords, the method may include generating a general transcription at step 825. The general transcription may include non-user specific content from the audio data. In some embodiments, the general transcription may not include any user-specific content from the audio data.

At step 830, the method may include receiving, from the first client device, a private transcription of the audio data. The private transcription may include the user-specific vocabulary (e.g., content) from the audio data. As discussed above, the private transcription may be generated using a vocabulary database including user-specific vocabulary. The vocabulary database may be generated by a delta model, such as the delta model 405, to include user-specific content.

At step 835, the method may include combining the general transcription with the private transcription. The general transcription may be combined with the private transcription to generate a complete transcription at step 840. In some embodiments, the method may include transmitting, to a second client device, the general transcription. In other embodiments, the method may include transmitting to a second client device the complete transcription. In such cases, the second client device may be an approved recipient by the first client device.

Figure 9:
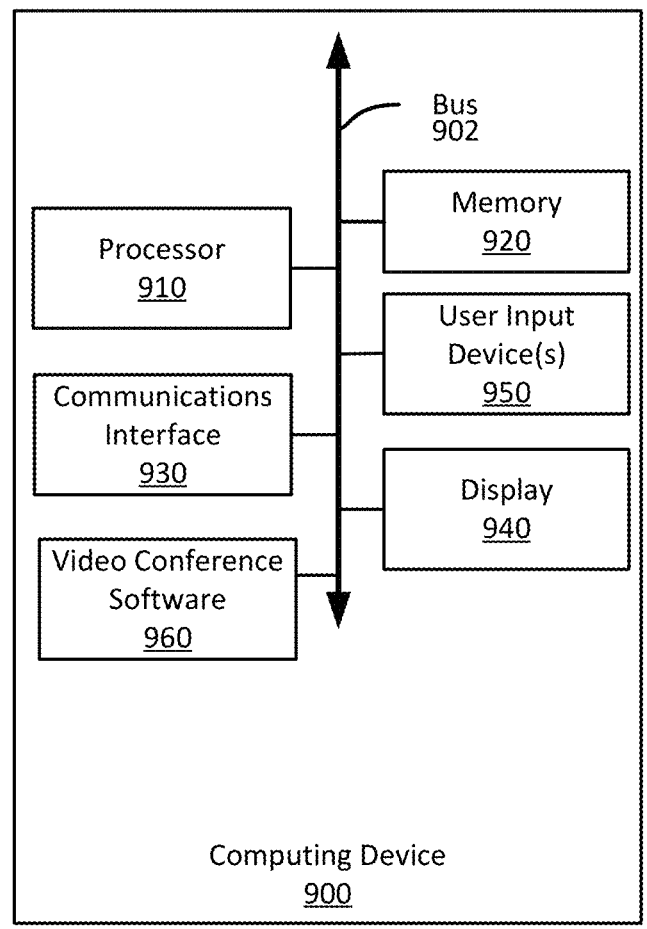
FIG. 9 shows an example computing device suitable for delta models for providing privatized speech-to-text during virtual meetings, according to this disclosure.

Referring now to FIG. 9, FIG. 9 shows an example computing device 900 suitable for use in example systems or methods for providing a delta model translating speech-to-text during virtual meetings. The example computing device 900 includes a processor 99 which is in communication with the memory 920 and other components of the computing device 900 using one or more communications buses 902. The processor 910 may be configured to execute processor-executable instructions stored in the memory 920 to perform one or more methods for providing a delta model translating speech-to-text during virtual meetings, such as part or all of the example method 700 and/or 800, described above with respect to FIGS. 7 and/or 8, respectively. The computing device, in this example, also includes one or more user input devices 950, such as a keyboard, mouse, touchscreen, video input device (e.g., one or more cameras), microphone, etc., to accept user input. The computing device 900 also includes a display 940 to provide visual output to a user.

The computing device 900 also includes a communications interface 930. In some examples, the communications interface 930 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification As used below, any reference to a series of examples is to be understood as a reference to each of those examples disjunctively (e.g., "Examples 1-4" is to be understood as "Examples 1, 2, 3, or 4").

Example 1 is a system comprising: a non-transitory computer-readable medium; a communications interface; and a processor communicatively coupled to the non-transitory computer-readable medium and the communications interface, the processor configured to execute processor-executable instructions stored in the non-transitory computer-readable medium to: join a virtual meeting, wherein each participant in the virtual meeting exchanges one or more audio streams with other participants in the virtual meeting via the virtual meeting; receive, from a video conference provider, a local model for speech recognition, wherein the local model comprises a copy of a centralized model; store the copy of the centralized model as a local recognizer; and perform speech recognition using the local model on the one or more audio streams, wherein performing speech recognition comprises: identifying, by the local recognizer, audio feature data within the one or more audio streams; identifying, based on a vocabulary database, user-specific vocabulary within the audio feature data; and generating, based on the user-specific vocabulary, a private transcription of the one or more audio streams, wherein the private transcription comprises the user-specific vocabulary.

Example 2 is a system comprising: a non-transitory computer-readable medium; a communications interface; and a processor communicatively coupled to the non-transitory computer-readable medium and the communications interface, the processor configured to execute processor-executable instructions stored in the non-transitory computer-readable medium to: establish a virtual meeting having a plurality of participants; transmit, to a first client device, a local model for speech recognition, wherein the local model comprises a copy of a centralized model; receive, from the first client device, audio data; perform, using the centralized model, speech recognition on the audio data to recognize one or more keywords; generate, based on the keywords, a general transcription, wherein the general transcription comprises non-user specific content from the audio data; receive, from the first client device, a private transcription of the audio data, wherein the private transcription comprises user-specific vocabulary; combine the general transcription with the private transcription; and generate a complete transcription, wherein the complete transcription comprises the general transcription and the private transcription.

Example 3 is the system of any previous or subsequent example, wherein the processor is configured to execute further processor-executable instructions stored in the non-transitory computer-readable medium to neutralize the private transcription, wherein neutralizing the private transcription comprises modifying the user-specific vocabulary in the private transcription; generate a neutralized transcription based on neutralizing the private transcription; and transmit, to the video conference provider, the neutralized transcription.

Example 4 is the system of any previous or subsequent example, wherein the processor is configured to execute further processor-executable instructions stored in the non-transitory computer-readable medium to: generate the vocabulary database based on locally available data, wherein the locally available data comprises one or more of:

a user's calendar; a user's email account; a user's contact list; past private transcriptions of a user's audio data; documents stored locally; and information associated with a virtual meeting.

Example 5 is the system of any previous or subsequent example, wherein the processor is configured to execute further processor-executable instructions stored in the non-transitory computer-readable medium to: train the local model, wherein training the local model comprises generating one or more associations between the audio feature data and a plurality of terms or phrases in the vocabulary database.

Example 6 is the system of any previous or subsequent example, wherein the processor is configured to execute further processor-executable instructions stored in the non-transitory computer-readable medium to: identify one or more irrelevant terms or phrases; and remove, from the vocabulary database, the one or more irrelevant terms or phrases.

Example 7 is the system of any previous or subsequent example, wherein the processor-executable instructions for identifying the one or more irrelevant terms or phrases cause the processor to execute further processor-executable instructions stored in the non-transitory computer-readable medium to: identify a time duration since the one or more irrelevant terms or phrases were identified in past spoken word; and determine the one or more irrelevant terms or phrases to be removable based on the time duration.

Example 8 is the system of any previous or subsequent example, wherein the instructions for performing speech recognition using the local model during the virtual meeting cause the processor to execute further processor-executable instructions stored in the non-transitory computer-readable medium to: receive, by the video conference provider, a partial transcription of the one or more audio streams, wherein the partial transcription comprises a transcription of non-user specific content from the one or more audio streams; and combine the partial transcription of the non-user specific content with a transcription of the user-specific vocabulary to generate the private transcription.

Example 9 is a method comprising: joining, by a first client device, a virtual meeting having a plurality of participants, each participant of the plurality of participants exchanging one or more audio streams via the virtual meeting; receiving, from a video conference provider, a local model for speech recognition, wherein the local model comprises a copy of a centralized model; storing, by the first client device, the copy of the centralized model as a local recognizer; performing, by the first client device, speech recognition using the local model on the one or more audio streams, wherein performing speech recognition comprises: identifying, by the local recognizer, audio feature data within the one or more audio streams; identifying, based on a vocabulary database, user-specific vocabulary within the audio feature data; and generating, based on the user-specific vocabulary, a private transcription of the one or more audio streams, wherein the private transcription comprises the user-specific vocabulary.

Example 10 is the method of any previous or subsequent example, further comprising: neutralizing, by the first client device, the private transcription, wherein neutralizing the private transcription comprises modifying the user-specific vocabulary in the private transcription; generating, by the first client device, a neutralized transcription based on neutralizing the private transcription; and transmitting, by the first client device to the video conference provider, the neutralized transcription.

Example 11 is the method of any previous or subsequent example, wherein modifying the user-specific vocabulary in the private transcription comprises at least one of: removing at least a portion of the user-specific vocabulary from the private transcription; or replacing at least a portion of the user-specific vocabulary in the private transcription with generic vocabulary.

Example 12 is the method of any previous or subsequent example, further comprising: transmitting, by the first client device to the video conference provider, an indication to share the neutralized transcription with the plurality of participants.

Example 13 is the method of any previous or subsequent example, further comprising: transmitting, to the video conference provider, the private transcription; neutralizing, by the video conference provider, the private transcription, wherein neutralizing the private transcription comprises modifying the user-specific vocabulary in the private transcription; and generating, by the video conference provider, a neutralized transcription based on neutralizing the private transcription.

Example 14 is the method of any previous or subsequent example, further comprising: transmitting, by the first client device to the video conference provider, an indication to share the private transcription with one or more of the plurality of participants.

Example 15 is a non-transitory computer-readable medium comprising processor-executable instructions configured to cause one or more processors to: join a virtual meeting having a plurality of participants, wherein each participant in the virtual meeting exchanges one or more audio streams with other participants in the virtual meeting via the virtual meeting; receive, from a video conference provider, a local model for speech recognition, wherein the local model comprises a copy of a centralized model; store the copy of the centralized model as a local recognizer; and perform speech recognition using the local model during the virtual meeting, wherein performing speech recognition comprises: identifying, by the local recognizer, audio feature data from the one or more audio streams; identifying, based on a vocabulary database, user-specific vocabulary within the audio feature data; and generating, based on the user-specific vocabulary, a private transcription of the one or more audio streams, wherein the private transcription comprises the user-specific vocabulary.

Example 16 is the non-transitory computer-readable medium of any previous or subsequent example, wherein the processor is configured to execute further processor-executable instructions stored in the non-transitory computer-readable medium to: generate the vocabulary database based on user-specific data, wherein the user-specific data comprises one or more of: a user's calendar; a user's email account; a user's contact list; past private transcriptions of a user's audio data; documents stored locally; and information associated with a virtual meeting.

Example 17 is the non-transitory computer-readable medium of any previous or subsequent example, wherein the processor is configured to execute further processor-executable instructions stored in the non-transitory computer-readable medium to: identify one or more topics associated with a virtual meeting invitation; perform, based on the one or more topics, an internet search; determine, based on results from the internet search, one or more terms or phrases associated with the one or more topics; and add the one or more terms or phrases to the vocabulary database.

Example 18 is the non-transitory computer-readable medium of any previous or subsequent example, wherein the processor is configured to execute further processor-executable instructions stored in the non-transitory computer-readable medium to: receive, via user input, an indication to search the user's email account for user-specific vocabulary; and perform a search through one or more emails in a user's email account for user-specific vocabulary; and identify, based on the search, one or more user-specific terms or phrases in the one or more emails; and add the one or more user-specific terms or phrases to the vocabulary database.

Example 19 is the non-transitory computer-readable medium of any previous or subsequent example, wherein the vocabulary database comprises: generic user-specific information comprises at least one of: a name of the user; or a location corresponding to the user; and transient user-specific information comprising one or more of: meeting specific information; project specific information; or email-based information.

Example 20 is the non-transitory computer-readable medium of any previous or subsequent example, wherein the processor is configured to execute further processor-executable instructions stored in the non-transitory computer-readable medium to: determine a time duration for the transient user-specific information in the vocabulary database; identify one or more terms or phrases based on the transient user-specific information; and remove, based on the time duration, the one or more terms or phrases from the vocabulary database.

Example 21 is the non-transitory computer-readable medium of any previous or subsequent example, wherein the processor is configured to execute further processor-executable instructions stored in the non-transitory computer-readable medium to: receive, from the video conference provider, a general transcription of the one or more audio streams, wherein the general transcription comprises transcription of non-user specific content from the one or more audio streams; and combine the general transcription with the private transcription of the user-specific vocabulary to generate a complete transcription.

That which is claimed is:

1. A system comprising:
a non-transitory computer-readable medium;
a communications interface; and
a processor communicatively coupled to the non-transitory computer-readable medium and the communications interface, the processor configured to execute processor-executable instructions stored in the non-transitory computer-readable medium to:
join a virtual meeting, wherein each participant in the virtual meeting exchanges one or more audio streams with other participants in the virtual meeting via the virtual meeting;
receive, from a video conference provider, a local model for speech recognition, wherein the local model comprises a copy of a centralized model;
store the copy of the centralized model as a local recognizer; and
perform speech recognition using the local model on the one or more audio streams, wherein performing speech recognition comprises:
identifying, by the local recognizer, audio feature data within the one or more audio streams;
identifying, based on a vocabulary database, user-specific vocabulary within the audio feature data; and
generating, based on the user-specific vocabulary, a private transcription of the one or more audio streams, wherein the private transcription comprises the user-specific vocabulary.

2. The system of claim 1, wherein the processor is configured to execute further processor-executable instructions stored in the non-transitory computer-readable medium to
neutralize the private transcription, wherein neutralizing the private transcription comprises modifying the user-specific vocabulary in the private transcription;
generate a neutralized transcription based on neutralizing the private transcription; and
transmit, to the video conference provider, the neutralized transcription.

3. The system of claim 1, wherein the processor is configured to execute further processor-executable instructions stored in the non-transitory computer-readable medium to:
generate the vocabulary database based on locally available data, wherein the locally available data comprises one or more of:
a user's calendar;
a user's email account;
a user's contact list;
past private transcriptions of a user's audio data;
documents stored locally; and
information associated with a virtual meeting.

4. The system of claim 1, wherein the processor is configured to execute further processor-executable instructions stored in the non-transitory computer-readable medium to:
train the local model, wherein training the local model comprises generating one or more associations between the audio feature data and a plurality of terms or phrases in the vocabulary database.

5. The system of claim 1, wherein the processor is configured to execute further processor-executable instructions stored in the non-transitory computer-readable medium to:
identify one or more irrelevant terms or phrases; and
remove, from the vocabulary database, the one or more irrelevant terms or phrases.

6. The system of claim 5, wherein the processor-executable instructions for identifying the one or more irrelevant terms or phrases cause the processor to execute further processor-executable instructions stored in the non-transitory computer-readable medium to:
identify a time duration since the one or more irrelevant terms or phrases were identified in past spoken word; and
determine the one or more irrelevant terms or phrases to be removable based on the time duration.

7. The system of claim 1, wherein the instructions for performing speech recognition using the local model during the virtual meeting cause the processor to execute further processor-executable instructions stored in the non-transitory computer-readable medium to:
receive, by the video conference provider, a partial transcription of the one or more audio streams, wherein the partial transcription comprises a transcription of non-user specific content from the one or more audio streams; and
combine the partial transcription of the non-user specific content with a transcription of the user-specific vocabulary to generate the private transcription.

8. A method comprising:
joining, by a first client device, a virtual meeting having a plurality of participants, each participant of the plurality of participants exchanging one or more audio streams via the virtual meeting;

receiving, from a video conference provider, a local model for speech recognition, wherein the local model comprises a copy of a centralized model;

storing, by the first client device, the copy of the centralized model as a local recognizer;

performing, by the first client device, speech recognition using the local model on the one or more audio streams, wherein performing speech recognition comprises:

identifying, by the local recognizer, audio feature data within the one or more audio streams;

identifying, based on a vocabulary database, user-specific vocabulary within the audio feature data; and generating, based on the user-specific vocabulary, a private transcription of the one or more audio streams, wherein the private transcription comprises the user-specific vocabulary.

9. The method of claim 8, further comprising:

neutralizing, by the first client device, the private transcription, wherein neutralizing the private transcription comprises modifying the user-specific vocabulary in the private transcription;

generating, by the first client device, a neutralized transcription based on neutralizing the private transcription; and transmitting, by the first client device to the video conference provider, the neutralized transcription.

10. The method of claim 9, wherein modifying the user-specific vocabulary in the private transcription comprises at least one of:

removing at least a portion of the user-specific vocabulary from the private transcription; or replacing at least a portion of the user-specific vocabulary in the private transcription with generic vocabulary.

11. The method of claim 9, further comprising:

transmitting, by the first client device to the video conference provider, an indication to share the neutralized transcription with the plurality of participants.

12. The method of claim 8, further comprising:

transmitting, to the video conference provider, the private transcription;

neutralizing, by the video conference provider, the private transcription, wherein neutralizing the private transcription comprises modifying the user-specific vocabulary in the private transcription; and generating, by the video conference provider, a neutralized transcription based on neutralizing the private transcription.

13. The method of claim 12, further comprising:

transmitting, by the first client device to the video conference provider, an indication to share the private transcription with one or more of the plurality of participants.

14. A non-transitory computer-readable medium comprising processor-executable instructions configured to cause one or more processors to:

join a virtual meeting having a plurality of participants, wherein each participant in the virtual meeting exchanges one or more audio streams with other participants in the virtual meeting via the virtual meeting;

receive, from a video conference provider, a local model for speech recognition, wherein the local model comprises a copy of a centralized model;

store the copy of the centralized model as a local recognizer; and perform speech recognition using the local model during the virtual meeting, wherein performing speech recognition comprises:

identifying, by the local recognizer, audio feature data from the one or more audio streams;

identifying, based on a vocabulary database, user-specific vocabulary within the audio feature data; and generating, based on the user-specific vocabulary, a private transcription of the one or more audio streams, wherein the private transcription comprises the user-specific vocabulary.

15. The non-transitory computer-readable medium of claim 14, wherein the processor is configured to execute further processor-executable instructions stored in the non-transitory computer-readable medium to:

generate the vocabulary database based on user-specific data, wherein the user-specific data comprises one or more of:

a user's calendar;

a user's email account;

a user's contact list;

past private transcriptions of a user's audio data;

documents stored locally; and information associated with a virtual meeting.

16. The non-transitory computer-readable medium of claim 14, wherein the processor is configured to execute further processor-executable instructions stored in the non-transitory computer-readable medium to:

identify one or more topics associated with a virtual meeting invitation;

perform, based on the one or more topics, an internet search;

determine, based on results from the internet search, one or more terms or phrases associated with the one or more topics; and add the one or more terms or phrases to the vocabulary database.

17. The non-transitory computer-readable medium of claim 15, wherein the processor is configured to execute further processor-executable instructions stored in the non-transitory computer-readable medium to:

receive, via user input, an indication to search the user's email account for user-specific vocabulary; and perform a search through one or more emails in a user's email account for user-specific vocabulary; and identify, based on the search, one or more user-specific terms or phrases in the one or more emails; and add the one or more user-specific terms or phrases to the vocabulary database.

18. The non-transitory computer-readable medium of claim 17, wherein the vocabulary database comprises:

generic user-specific information comprises at least one of:

a name of the user; or a location corresponding to the user; and transient user-specific information comprising one or more of:

meeting specific information;

project specific information; or email-based information.

19. The non-transitory computer-readable medium of claim 18, wherein the processor is configured to execute further processor-executable instructions stored in the non-transitory computer-readable medium to:

determine a time duration for the transient user-specific information in the vocabulary database;

identify one or more terms or phrases based on the transient user-specific information; and remove, based on the time duration, the one or more terms or phrases from the vocabulary database.

20. The non-transitory computer-readable medium of claim 18, wherein the processor is configured to execute further processor-executable instructions stored in the non-transitory computer-readable medium to:

receive, from the video conference provider, a general transcription of the one or more audio streams, wherein the general transcription comprises transcription of non-user specific content from the one or more audio streams; and combine the general transcription with the private transcription of the user-specific vocabulary to generate a complete transcription.

* * * * *